(12) United States Patent
Hirata et al.

(10) Patent No.: US 8,472,137 B2
(45) Date of Patent: Jun. 25, 2013

(54) MAGNETIC HEAD AND METHOD OF MANUFACTURE THEREOF WHEREIN THE HEAD INCLUDES A POLE LAYER AND NON-MAGNETIC LAYER HAVING A CONTINUOUS TAPERED FACE OPPOSED TO A TRAILING SHIELD

(75) Inventors: Kei Hirata, Tokyo (JP); Kenkichi Anagawa, Tokyo (JP); Michitaka Nishiyama, Tokyo (JP); Hideyuki Yatsu, Tokyo (JP); Shin Narushima, Tokyo (JP); Hisayoshi Watanabe, Tokyo (JP); Tatsuhiro Nojima, Tokyo (JP)

(73) Assignee: TDK Corporation, Tokyo (JP)

( * ) Notice: Subject to any disclaimer, the term of this patent is extended or adjusted under 35 U.S.C. 154(b) by 309 days.

(21) Appl. No.: 12/845,349

(22) Filed: Jul. 28, 2010

(65) Prior Publication Data

US 2012/0026629 A1    Feb. 2, 2012

(51) Int. Cl.
*G11B 5/187* (2006.01)
*G11B 5/23* (2006.01)

(52) U.S. Cl.
USPC ............ 360/125.11; 360/125.13; 360/125.15

(58) Field of Classification Search
USPC ............... 360/125.11, 125.15, 125.09, 125.1, 360/125.12, 125.13, 125.14
See application file for complete search history.

(56) References Cited

U.S. PATENT DOCUMENTS

| | | | |
|---|---|---|---|
| 7,212,379 B2 | 5/2007 | Hsu et al. | |
| 7,643,246 B2 * | 1/2010 | Yazawa et al. | 360/125.2 |
| 7,715,152 B2 * | 5/2010 | Okada et al. | 360/319 |
| 7,924,528 B2 * | 4/2011 | Sasaki et al. | 360/125.15 |
| 8,184,399 B2 * | 5/2012 | Wu et al. | 360/125.15 |
| 8,201,320 B2 * | 6/2012 | Allen et al. | 29/603.16 |
| 8,233,235 B2 * | 7/2012 | Chen et al. | 360/125.15 |
| 8,254,060 B1 * | 8/2012 | Shi et al. | 360/125.1 |
| 8,270,110 B2 * | 9/2012 | Araki et al. | 360/125.11 |
| 8,274,759 B1 * | 9/2012 | Sasaki et al. | 360/125.13 |
| 8,289,656 B1 * | 10/2012 | Huber | 360/264.2 |

(Continued)

FOREIGN PATENT DOCUMENTS

| | | |
|---|---|---|
| JP | 2005-293822 | 10/2005 |
| JP | 2009-64539 | 3/2009 |

OTHER PUBLICATIONS

U.S. Appl. No. 13/176,134, filed Jul. 5, 2011, Watanabe, et al.
U.S. Appl. No. 13/402,318, filed Feb. 22, 2012, Hirata, et al.

*Primary Examiner* — Jefferson Evans
(74) *Attorney, Agent, or Firm* — Oblon, Spivak, McClelland, Maier & Neustadt, L.L.P.

(57) ABSTRACT

The present invention relates to a magnetic head, a manufacturing method therefor, a head assembly, and a magnetic recording/reproducing apparatus. According to the present invention, it includes a magnetic pole layer, a non-magnetic layer, a trailing gap layer, and a trailing shield layer. The magnetic pole layer has a pole tip exposed on a magnetic medium-facing surface. The non-magnetic layer is laid on the magnetic pole layer. The trailing shield layer is exposed on the magnetic medium-facing surface and laid over the magnetic pole layer and the non-magnetic layer with the trailing gap layer between. The magnetic pole layer and the non-magnetic layer have a continuous tapered face opposed to a lower side of the trailing shield layer. Moreover, the tapered face extends from a trailing edge of the pole tip at a constant inclination angle.

14 Claims, 20 Drawing Sheets

U.S. PATENT DOCUMENTS

| | | | |
|---|---|---|---|
| 8,295,008 B1 * | 10/2012 | Sasaki et al. | 360/125.02 |
| 8,305,711 B2 * | 11/2012 | Li et al. | 360/125.31 |
| 2002/0034043 A1 * | 3/2002 | Okada et al. | 360/125 |
| 2005/0219747 A1 * | 10/2005 | Hsu et al. | 360/126 |
| 2008/0297953 A1 | 12/2008 | Matono et al. | |
| 2009/0059426 A1 | 3/2009 | Sasaki et al. | |
| 2009/0122445 A1 * | 5/2009 | Jiang et al. | 360/123.12 |
| 2010/0157476 A1 * | 6/2010 | Kudo et al. | 360/125.12 |
| 2011/0134569 A1 * | 6/2011 | Allen et al. | 360/123.12 |
| 2011/0135962 A1 * | 6/2011 | Hong et al. | 428/815 |

* cited by examiner

MAGNETIC HEAD AND METHOD OF MANUFACTURE THEREOF WHEREIN THE HEAD INCLUDES A POLE LAYER AND NON-MAGNETIC LAYER HAVING A CONTINUOUS TAPERED FACE OPPOSED TO A TRAILING SHIELD

TECHNICAL FIELD

The present invention relates to a magnetic head, a manufacturing method therefor, a head assembly, and a magnetic recording/reproducing apparatus.

BACKGROUND OF THE INVENTION

In order to improve recording performance of information, various improvements have been made in a magnetic head to be used for a magnetic recording/reproducing apparatus such as a hard disk drive (HDD). For example, Japanese Unexamined Patent Application Publication No. 2005-293822 discloses a technology of increasing the strength of a recording magnetic field, wherein an upper face of a recording magnetic pole and an opposing lower face of a trailing shield are provided with a taper on the side of an ABS so that a leakage magnetic flux to the trailing shield can be inclined toward a recording medium. On the other hand, Japanese Unexamined Patent Application Publication No. 2009-64539 discloses a technology of gently increasing the thickness of a magnetic pole layer rearward from an ABS so as to reduce a leakage magnetic flux from a magnetic pole.

According to the former technology, however, the tapered face of the magnetic pole is wholly opposed to the trailing shield, which excessively generates a leakage magnetic flux from the magnetic pole to the trailing shield. According to the latter technology, on the other hand, the magnetic pole is formed with a tapered face whose inclination angle varies in a stepwise fashion or the magnetic pole is formed with a curved face instead of the tapered face, so that as a result of obtaining a magnetic pole layer whose thickness varies gently, an area of the magnetic pole opposed to the trailing shield inevitably increases to cause a similar problem.

If a large amount of magnetic flux leaks to the trailing shield, as described above, the trailing shield easily causes magnetic saturation, so that the recording magnetic field from the magnetic pole to the magnetic recording medium cannot have a sufficient magnetic field gradient. In general, the magnetic field gradient has a great impact on recording performance of information, and it is known that the larger the magnetic field gradient, the lower the jitter of a magnetic transition region between bits of information to be recorded on the magnetic recording medium, making a boundary of the region clear, which results in achieving excellent bit error rate.

SUMMARY OF THE INVENTION

It is an object of the present invention to provide a magnetic head capable of improving bit error rate, a manufacturing method therefor, a head assembly, and a magnetic recording/reproducing apparatus.

1. Magnetic Head

In order to achieve the above object, a magnetic head according to the present invention comprises a magnetic pole layer, a non-magnetic layer, a trailing gap layer, and a trailing shield layer.

The magnetic pole layer has a pole tip exposed on a magnetic medium-facing surface. The non-magnetic layer is laid on the magnetic pole layer.

The trailing shield layer is exposed on the magnetic medium-facing surface and laid over the magnetic pole layer and the non-magnetic layer with the trailing gap layer between.

The magnetic pole layer and the non-magnetic layer have a continuous tapered face opposed to a lower side of the trailing shield layer. Then, the tapered face extends from a trailing edge of the pole tip at a constant inclination angle.

In the magnetic head according to the present invention, since the magnetic pole layer and the non-magnetic layer have a continuous tapered face opposed to a lower side of the trailing shield layer, a part of the tapered face is formed of the non-magnetic layer, which makes it possible to reduce an area of the tapered face of the magnetic pole layer opposed to the lower side of the trailing shield layer.

In addition, since the tapered face extends from the trailing edge of the pole tip at a constant inclination angle, the opposing area of the tapered face can be minimized, unlike the stepwise variation of the inclination angle or the curved face in the above-described prior art. Therefore, it is possible to minimize a leakage magnetic flux from the magnetic pole layer to the trailing shield layer.

Moreover, since the non-magnetic layer is laid on the magnetic pole layer and the tapered face extends from the trailing edge of the pole tip and continues from the magnetic pole layer to the non-magnetic layer, one end of the non-magnetic layer on the side of the magnetic medium-facing surface becomes a part of the tapered face. Therefore, as compared with the case where the above-mentioned end is not a tapered face but an end face generally parallel to the magnetic medium-facing surface, it is possible to increase a volume of the trailing shield layer.

In the magnetic head according to the present invention, a tolerance of the trailing shield layer for magnetic saturation can be improved by suppressing the leakage magnetic flux to the trailing shield layer and increasing the volume of the trailing shield layer, as described above.

In the magnetic head according to the present invention, moreover, since the pole tip and the trailing shield layer are exposed on the magnetic medium-facing surface, the increased tolerance makes it easy for the trailing shield layer to absorb the magnetic flux from the pole tip through the magnetic recording medium, so that the above magnetic field gradient can be suitably obtained to improve the above bit error rate.

2. Head Assembly

In order to achieve the above object, a head assembly according to the present invention comprises the above magnetic head and a head support device.

The head support device supports the magnetic head in such a manner as to permit rolling and pitching of the magnetic head.

In the present invention, examples of the head assembly include an HGA (head gimbal assembly) in which the magnetic head is mounted on a head support device (gimbal) and an HAA (head arm assembly) in which the HGA is mounted on an arm.

Since the head assembly according to the present invention includes the above magnetic head, it also exhibits the effects thus far described.

3. Magnetic Recording/Reproducing Apparatus

A magnetic recording/reproducing apparatus according to the present invention comprises the above head assembly and a magnetic recording medium. The head assembly is capable of recording information on the magnetic recording medium by applying a recording magnetic field and reproducing information from the magnetic recording medium. A typical example of the magnetic recording/reproducing apparatus is a hard disk drive (HDD) using a magnetic recording medium called "hard disk".

Since the head assembly according to the present invention includes the above magnetic head, it also exhibits the effects thus far described.

4. Magnetic Head Manufacturing Method

A method for manufacturing a magnetic head according to the present invention comprises the following steps of:
(1) forming a magnetic pole layer with a pole tip exposed on a magnetic medium-facing surface;
(2) forming a non-magnetic layer laid on the magnetic pole layer;
(3) forming a mask on the non-magnetic layer;
(4) forming a tapered face by milling to extend from a trailing edge of the pole tip, continue from the magnetic pole layer to the non-magnetic layer, and have a constant inclination angle;
(5) forming a trailing gap layer laid on the magnetic pole layer and the non-magnetic layer to cover at least the tapered face; and
(6) forming a trailing shield layer laid over the magnetic pole layer and the non-magnetic layer with the trailing gap layer between to be exposed on the magnetic medium-facing surface.

Since the magnetic head manufacturing method according to the present invention provides the above magnetic head, it also exhibits the effects thus far described.

The other objects, constructions and advantages of the present invention will be further detailed below with reference to the attached drawings. However, the attached drawings show only illustrative examples.

DESCRIPTION OF THE PREFERRED EMBODIMENTS

1. Magnetic Head

Figure 1:
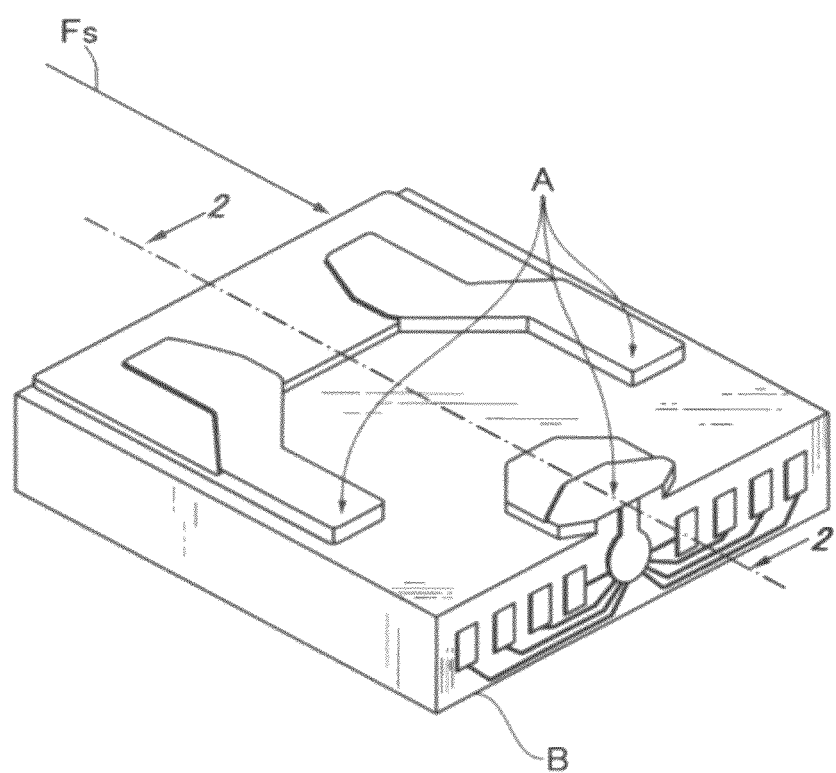
FIG. 1 is a perspective view of a magnetic head according to the present invention.

FIG. 1 shows an exemplary appearance of a magnetic head according to the present invention. The magnetic head has a slider substrate B of a generally rectangular prism structure and an air bearing surface A directly relating to floating characteristics. The air bearing surface A is configured to generate a pressure for floating the magnetic head utilizing viscosity of fluid flow Fs generated by rotation of a magnetic disk.

Figure 2:
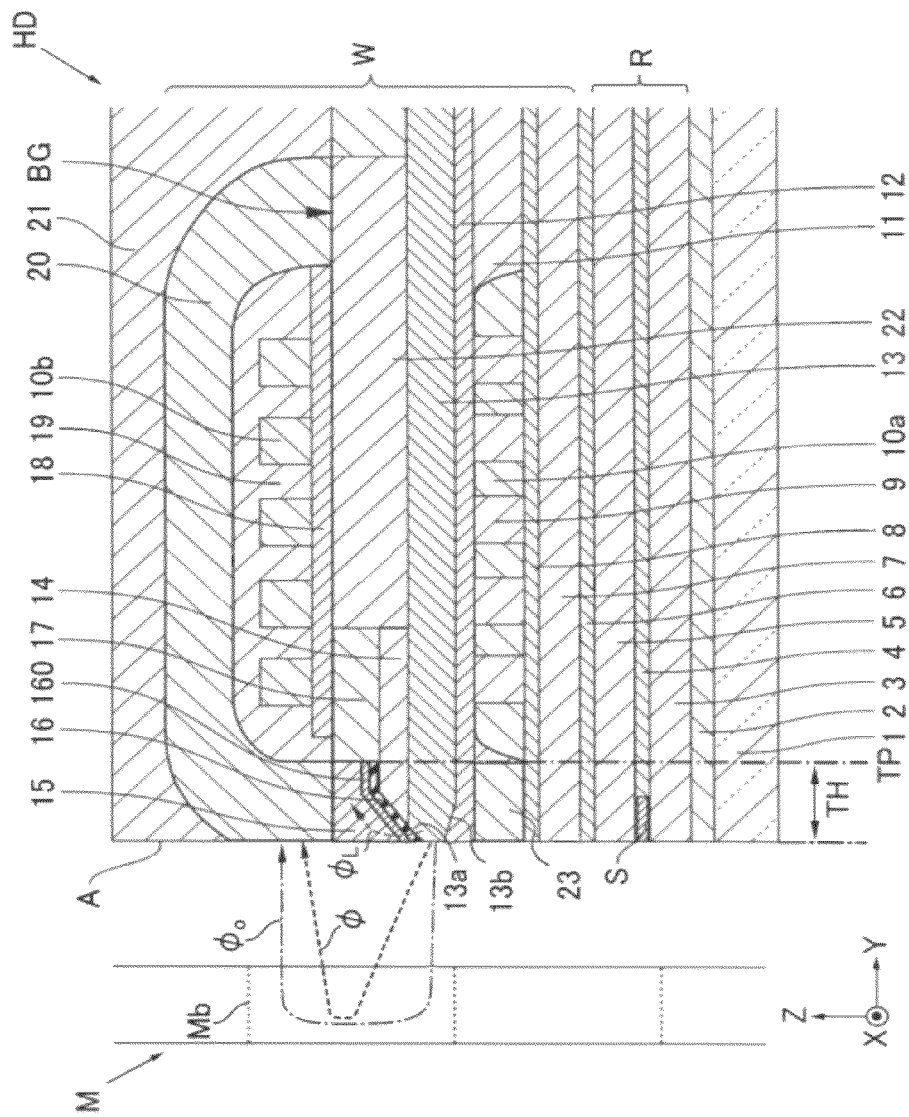
FIG. 2 is a partial sectional view taken along line 2-2 in FIG. 1.
Figure 3:
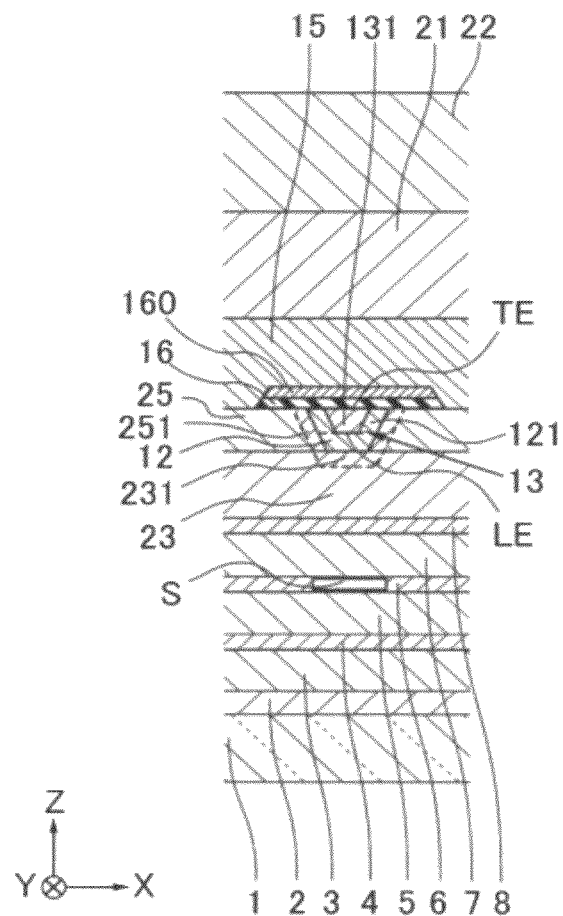
FIG. 3 is a partial plan view of a magnetic medium-facing surface of a magnetic head.

FIG. 2 shows a section taken along line 2-2 in FIG. 1, while FIG. 3 shows the air bearing surface A, i.e., magnetic medium-facing surface A in a frontal view. Referring to these figures, the layer structure of the magnetic head HD will be described below.

In the following description, dimensions along the X, Y, and Z axes shown in the figures are designated "width", "length", and "thickness", respectively. Along the Y axis, moreover, one side close to the air bearing surface A and the other side remote therefrom are designated "front" and "rear", respectively. Along the Z axis, furthermore, front and rear sides are designated "trailing side" and "leading side", respectively.

The magnetic head HD is formed by stacking, on a substrate 1, an insulating layer 2, a reproducing head R using magneto-resistive effect (MR), a separating layer 6, a recording head W for performing a recording process in a perpendicular recording system, and an overcoat layer 21 in the named order. The magnetic medium-facing surface A is one side face shared by these elements and opposed to a surface of a magnetic recording medium M.

The substrate 1 is made of a ceramic material such as AlTiC ($Al_2O_3 \cdot TiC$) or the like. The insulating layer 2, the separating layer 6, and the overcoat layer 21 are made of a non-magnetic insulating material such as aluminum oxide or the like. The aluminum oxide may be alumina ($Al_2O_3$) or the like.

The reproducing head R is formed by stacking a lower read shield layer 3, a shield gap layer 4, and an upper read shield layer 5 in the named order. In the shield gap layer 4, a reproducing element S is embedded with one end face exposed on the magnetic medium-facing surface A.

Both the lower read shield layer 3 and the upper read shield layer 5 magnetically separate the reproducing element S from the surroundings and extend rearward from the magnetic medium-facing surface A. The lower read shield layer 3 and the upper read shield layer 5 are made of a magnetic material such as nickel-iron alloy (NiFe). The nickel-iron alloy may be permalloy, for example. Here, the lower read shield layer 3 and the upper read shield layer 5 may have a single layer structure or a multilayer structure in which a non-magnetic layer made of a non-magnetic insulating material such as ruthenium (Ru) or alumina is sandwiched between a pair of magnetic layers made of a magnetic material such as permalloy, for example.

Moreover, the shied gap layer 4 electrically separates the reproducing element S from the surroundings and is made of a non-magnetic insulating material such as alumina. The reproducing element S is an element having a giant magneto-resistive effect (GMR) or a tunneling magneto-resistive effect (TMR), and typically a TMR element may be employed.

On the other hand, the recording head W includes a magnetic layer 7, a leading shield layer 23, a main magnetic pole layer 13, a non-magnetic layer 14, an auxiliary magnetic pole layer 22, a trailing shield layer 15, a trailing gap layer 16, a second magnetic layer 160, thin film coils 10a, 10b, a return yoke layer 20, and insulating layers 8, 9, 11, 12, 17, 18, 19.

The magnetic layer 7 serves as a return path on the leading side and is made of a magnetic material such as NiFe or CoNiFe. With this magnetic layer 7, a part of a magnetic flux φ emitted from the main magnetic pole layer 13 can be dispersed toward the leading side to reduce a WATE (wide adjacent track erase) effective magnetic field. The WATE effective magnetic field refers to an effective magnetic field which has an effect on a wide area of adjacent tracks (for example, within the area of 2 to 10 lanes from a target track for writing).

The thin film coils 10a, 10b are made of a highly conductive material such as copper into a spiral shape and generate a recording magnetic field according to information to be recorded on the magnetic recording medium M. Spaces between windings of the lower coil layer 10a are filled with the insulating layer 9, which is further surrounded by the insulating layer 11, and on its trailing side, there is formed the leading shield layer 23. On the other hand, spaces between winding of the upper coil layer 10b are filled with the insulating layer 19, and on its leading side, there is formed the insulating layer 18.

The insulating layers 9, 19 are made of a non-magnetic insulating material such as photoresist or spin-on glass (SOG), while the insulating layers 11, 12, 18 are made of a non-magnetic insulating material such as alumina. These insulating layers 9, 11, 12, 18, 19 electrically separate the thin film coils 10a, 10b from the surroundings.

The characteristic feature of the magnetic head according to the present invention resides in the main magnetic pole layer 13, the non-magnetic layer 14, the trailing gap layer 16, the second magnetic layer 160, and the trailing shield layer 15.

The main magnetic pole film 13 is made of a magnetic material with a high saturation density such as iron-cobalt alloy or iron-cobalt-nickel alloy and emits the magnetic flux φ from the recording medium-facing surface A into the magnetic recording medium M with the recording magnetic field generated from the thin film coils 10a, 10b.

Figure 5:
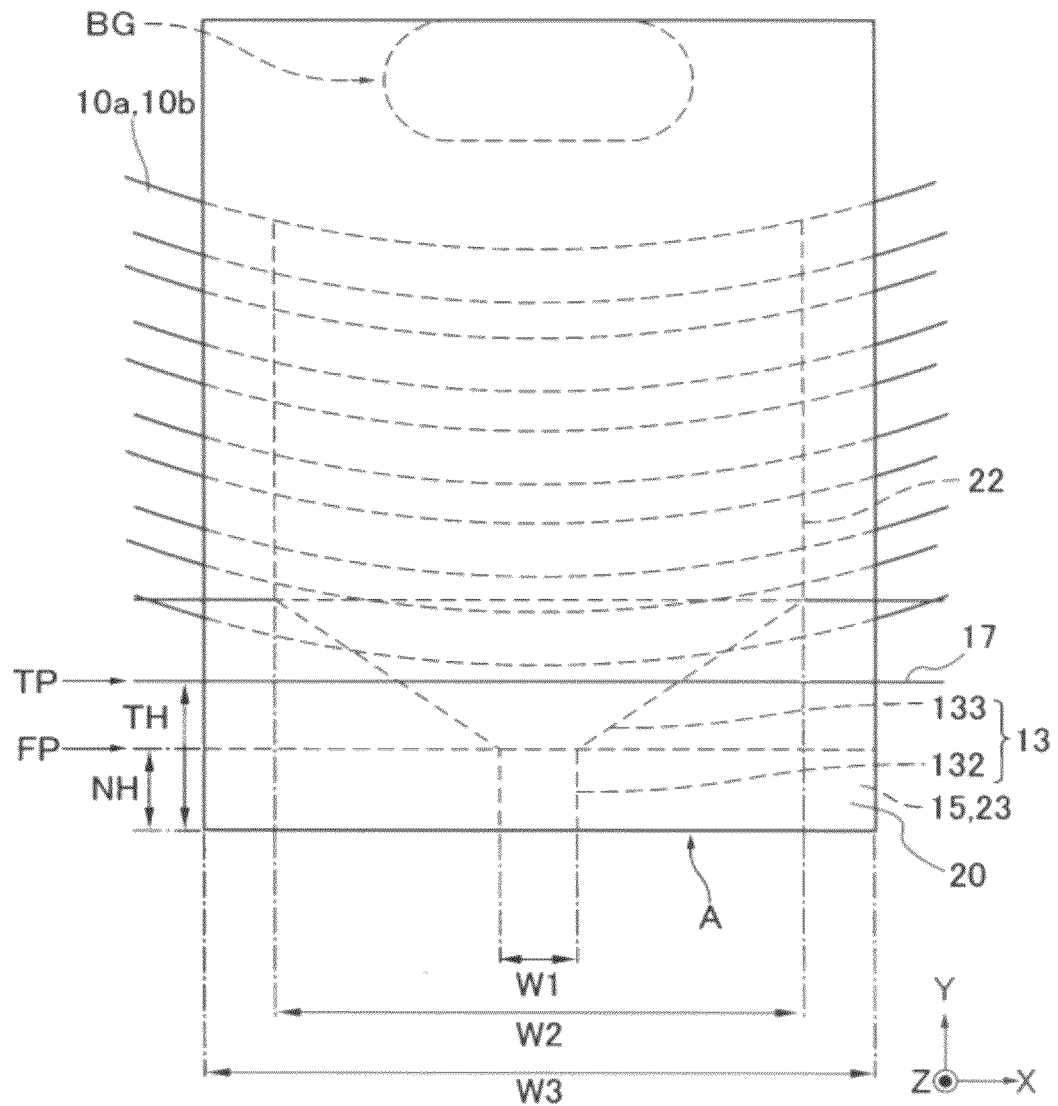
FIG. 5 is a plan view of a main magnetic pole layer of a magnetic head.

FIG. 5 shows the shape of the main magnetic pole layer 13 as seen from a lamination plane (X-Y plane) of the magnetic head. The main magnetic pole layer 13 has a tip portion 132, whose width W1 defines a recording track width, and a rear portion 133, whose width W2 is larger than the width W1. The tip portion 132 substantially generates the magnetic flux φ for recording. Furthermore, the width of the rear portion 133 increases from the width W1 at the forefront to the constant width W2 behind it, wherein the position at which the width starts to increase is referred to as flare point FP and the distance between the flare point FP and the magnetic medium-facing surface A is defined as neck height NH.

The main magnetic pole layer 13 has a pole tip 131 exposed on the recording medium-facing surface A, as shown in FIG. 3, and extends rearward from the pole tip 131. The pole tip 131 has an inverted trapezoid shape, wherein a trailing edge TE has a larger width than a leading edge LE. The upper side of the inverted trapezoid shape, i.e., the trailing edge TE is a substantial recording portion of the main magnetic pole layer 13, and its width W1 defines the recording track width. Typically, the recording track width is approximately 0.2 μm or less.

Moreover, the main magnetic pole layer 13 is enclosed by the leading shield layer 23 on the leading side, by the side shields 25 on both sides in the lamination plane, and by the trailing shield layer 15 on the trailing side. The leading shield layer 23, the trailing shield layer 15, and the side shields 25 are made of, for example, a magnetic material similar to that of the main magnetic pole layer 13 and absorbs the magnetic flux mainly in the vicinity of the magnetic medium-facing surface A to prevent dispersion of the magnetic flux. This increases the magnetic field gradient and also narrows the recording track width.

The leading shield layer 23, the trailing shield layer 15, and the side shields 25 are each exposed on the magnetic medium-facing surface A and extend from the exposed end face to a throat height zero position TP behind it. The trailing shield layer 15 and the side shields 25 are adjacent to the insulating layer 17 at each rear end.

The leading shield layer 23 is formed to be opposed to the leading side of the main magnetic pole layer 13 across the insulating layer 12. The leading shield layer 23 is not an essential component for the magnetic head and may be provided if necessary.

The side shields 25 are formed to sandwich the main magnetic pole film 13 from both sides with a pair of side gaps 121 between. The pair of side gaps 121 are made of an insulating material and extend from the insulating layer 12 toward the trailing side along both sides of the pole tip 131, thereby magnetically separating the main magnetic pole layer 13 and the side shields 25.

In the side shields 25 and the leading shield layer 23, portions 251, 231 having a lower saturation magnetic flux density than other portions are provided adjacent to the side gaps 121 and the insulating layer 12, respectively. The portions 251, 231 can be obtained, for example, by applying an alloy whose composition ratio is different from that of other portions and have an effect of increasing the above-described magnetic field gradient while suppressing the WATE effective magnetic field as compared with the case where they are formed with a uniform magnetic flux density.

The trailing shield layer 15 mainly has a function of increasing the perpendicular magnetic field gradient and is laid over the main magnetic pole layer 13 and the non-magnetic layer 14 with the trailing gap layer 16 and the second magnetic layer 160 between. The trailing shield layer 15 is preferably made of a magnetic material having a high saturation magnetic flux density such as cobalt-nickel-iron alloy, nickel-iron alloy or iron-based alloy.

The second magnetic layer 160 is disposed beneath the trailing shield layer 15 and is made of a magnetic material having a high saturation magnetic flux density such as iron, nickel or cobalt-iron alloy. As shown in FIG. 3, the second magnetic layer 160, as well as the trailing gap layer 16, is provided only in the vicinity of the upper side of the pole tip 131 as seen from the magnetic medium-facing surface A. This prevents excessive dispersion of the magnetic flux φ emitted from the pole tip 131.

The trailing gap layer 16 is made of a non-magnetic material such as alumina and magnetically separates the main magnetic pole layer 13 and the trailing shield layer 15.

As shown in FIG. 2, the magnetic flux φ emitted from the pole tip 131 can be absorbed by the trailing shield layer 15 and the return yoke layer 20 through a soft under layer and the like of the magnetic recording medium M.

As shown in FIG. 5, the return yoke layer 20 has a rectangular plan shape of a width W3 as seen along the Z axis and is made of, for example, a magnetic material similar to that of the trailing shield layer 15 to have a function of circulating the magnetic flux. On the trailing side of the trailing shield layer 15, the return yoke layer 20 extends from the magnetic medium-facing surface A, passes over the insulating layer 19, and reaches a back gap BG to be connected to the auxiliary magnetic pole layer 22 at the rear through the back gap BG while being connected to the trailing shield layer 15 at the front. However, the function of circulating the magnetic field may be provided not only to the return yoke layer 20 but also to the trailing shield layer 15 and the side shields 25.

The auxiliary magnetic pole layer 22 is made of a magnetic material similar to or different from that of the main magnetic pole layer 13 and is directly laid on the main magnetic pole layer 13 at a position away from the magnetic medium-facing surface A, as shown in FIG. 2. Thus, the auxiliary magnetic pole layer 22 serves as an auxiliary magnetic flux storage area for supplying a magnetic flux to the main magnetic pole film 13. In addition, the auxiliary magnetic pole layer 22 is connected to the non-magnetic film 14 at a front end.

The non-magnetic layer 14 is made of a non-magnetic material such as ruthenium and laid on the main magnetic pole 13. Furthermore, the insulating layer 17, which is made of a non-magnetic insulating material such as alumina, is laid on the non-magnetic layer 14. The insulating layer 17 has a front end face which defines the throat height TH and the throat height zero position TP.

Figure 4:
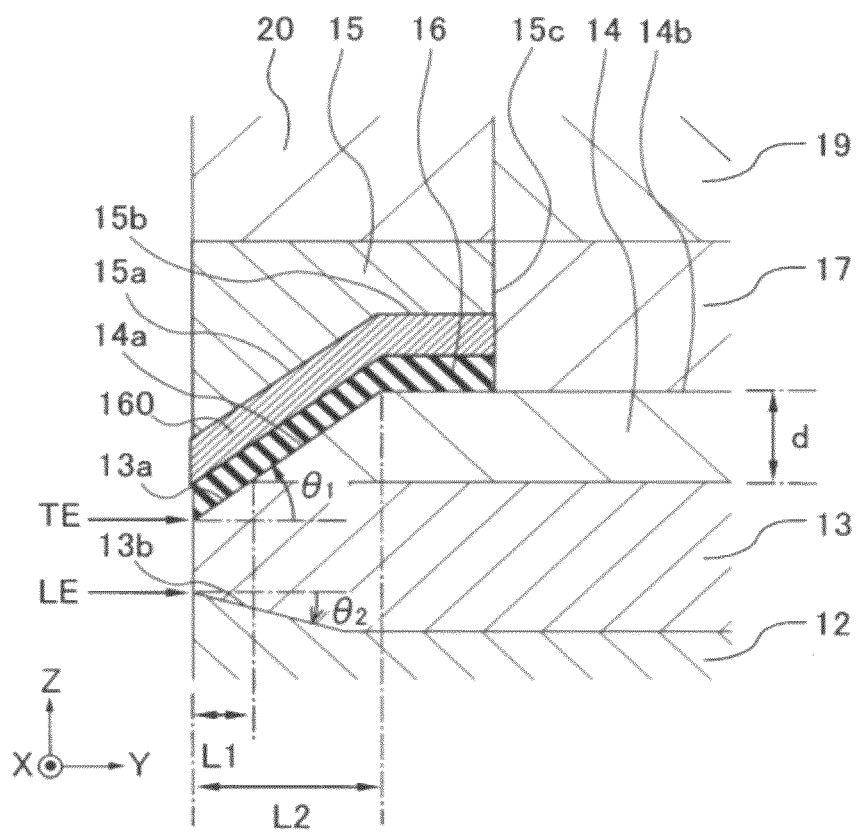
FIG. 4 is an enlarged view of FIG. 2 near a main magnetic pole layer on the side of a magnetic medium-facing surface.

FIG. 4 shows an enlarged view of FIG. 2 near the main magnetic pole layer 13 on the side of the magnetic medium-facing surface A. The main magnetic pole layer 13 and the non-magnetic layer 14 have a continuous tapered face 13a, 14a opposed to a lower side 15a of the trailing shield layer 15. The tapered face 13a, 14a extends from the trailing edge TE of the pole tip 131 at a constant inclination angle $\theta_1$. In other words, the tapered face 13a of the main magnetic pole layer 13 and the tapered face 14a of the non-magnetic layer 14 form a single continuous slope of a constant inclination angle $\theta_1$.

Here, the angle $\theta_1$ may be properly set, for example, within the range of 15 to 30 degrees. In addition, a distance L1 between the magnetic medium-facing surface A and a rear end of the tapered face 13a of the main magnetic pole layer 13 is, for example, 120 (nm), while a distance L2 between the magnetic medium-facing surface A and a rear end of the tapered face 14a of the non-magnetic layer 14 is, for example, 270 (nm). Moreover, a thickness d of the non-magnetic layer 14 is, for example, 70 (nm). However, these values are mere examples and may be determined properly depending on design.

With this characteristic structure, a part of the tapered face 13a, 14a is formed of the non-magnetic layer 14, which makes it possible to reduce an area of the tapered face 13a of the main magnetic pole layer 13 opposed to the lower side 15a of the trailing shield layer 15.

In addition, since the tapered face 13a, 14a extends from the trailing edge TE of the pole tip 131 at a constant inclination angle $\theta_1$, the opposing area of the tapered face 13a of the main magnetic pole layer 13 can be minimized, unlike the stepwise variation of the inclination angle or the curved face in the above-described prior art. Therefore, a leakage magnetic flux $\phi_L$ flowing from the main magnetic pole layer 13 to the trailing shield layer 15 as shown in FIG. 2 can be minimized by properly setting the above-described parameters L1, L2, d, or the like.

Moreover, the end 14a of the non-magnetic layer 14 on the side of the magnetic medium-facing surface A becomes a part of the tapered face 13a, 14a. Therefore, as compared with the case where the above-mentioned end 14a is not a tapered face but an end face generally parallel to the magnetic medium-facing surface A, it is possible to increase a volume of the trailing shield layer 15.

A tolerance of the trailing shield layer 15 for magnetic saturation can be improved by suppressing the leakage magnetic flux $\phi_L$ to the trailing shield layer 15 and increasing the volume of the trailing shield layer 15, as described above.

Moreover, since the pole tip 131 and the trailing shield layer 15 are exposed on the magnetic medium-facing surface A, the increased tolerance makes it easy for the trailing shield layer 15 to absorb the magnetic flux $\phi$ from the pole tip 131 through the magnetic recording medium M, so that the above magnetic field gradient can be suitably obtained to improve the bit error rate. This is because the improved magnetic field gradient reduces jitter of a magnetic transition region between bits of the magnetic recording medium M, thereby making a boundary Mb of the region clear.

On the other hand, if the tolerance of the trailing shield layer 15 for magnetic saturation is low, the magnetic field from the pole tip 131 has a low magnetic field gradient, like a magnetic flux $\phi_0$ shown in FIG. 2, so that excellent bit error rate cannot be obtained.

Referring again to FIG. 4, the non-magnetic layer 14 has a flat face 14b continuous with a rear end of the tapered face 14a as seen from the magnetic medium-facing surface A. The flat face 14b is at least partially opposed to a lower side 15b of the trailing shield layer 15 across the trailing gap layer 16 and the second magnetic layer 160. The lower side 15b is formed to be continuous with a rear end of the lower side 15a opposed to the tapered face 13a, 14a and generally parallel to the X-Y plane.

The main magnetic pole layer 13 also has a second tapered face 13b extending from the leading edge LE of the pole tip 131. Here, an inclination angle $\theta_2$ of the second tapered face 13b with respect to the lamination plane (X-Y plane) may be properly set within the range of about 15 to 60 degrees.

The second tapered face 13b reduces the thickness of the main magnetic pole film 13, concentrating the magnetic flux of the magnetic field emitted from the main magnetic pole layer 13. Considering that the area of the first tapered face 13a is reduced, as described above, this is effective because the magnetic flux density can be increased to compensate for the reduction.

Since it is desirable to increase the magnetic flux density at the tip portion 132 of the main magnetic pole layer 13, the rear end of the first tapered face 13a and the rear end of the second tapered face 13b are preferably located in front of the throat height zero position TP as seen from the magnetic medium-facing surface A. Also from the same reason, the rear end of the second tapered face 13b is preferably located in front of the rear end of the first tapered face 13a as seen from the magnetic medium-facing surface A.

Figure 6:
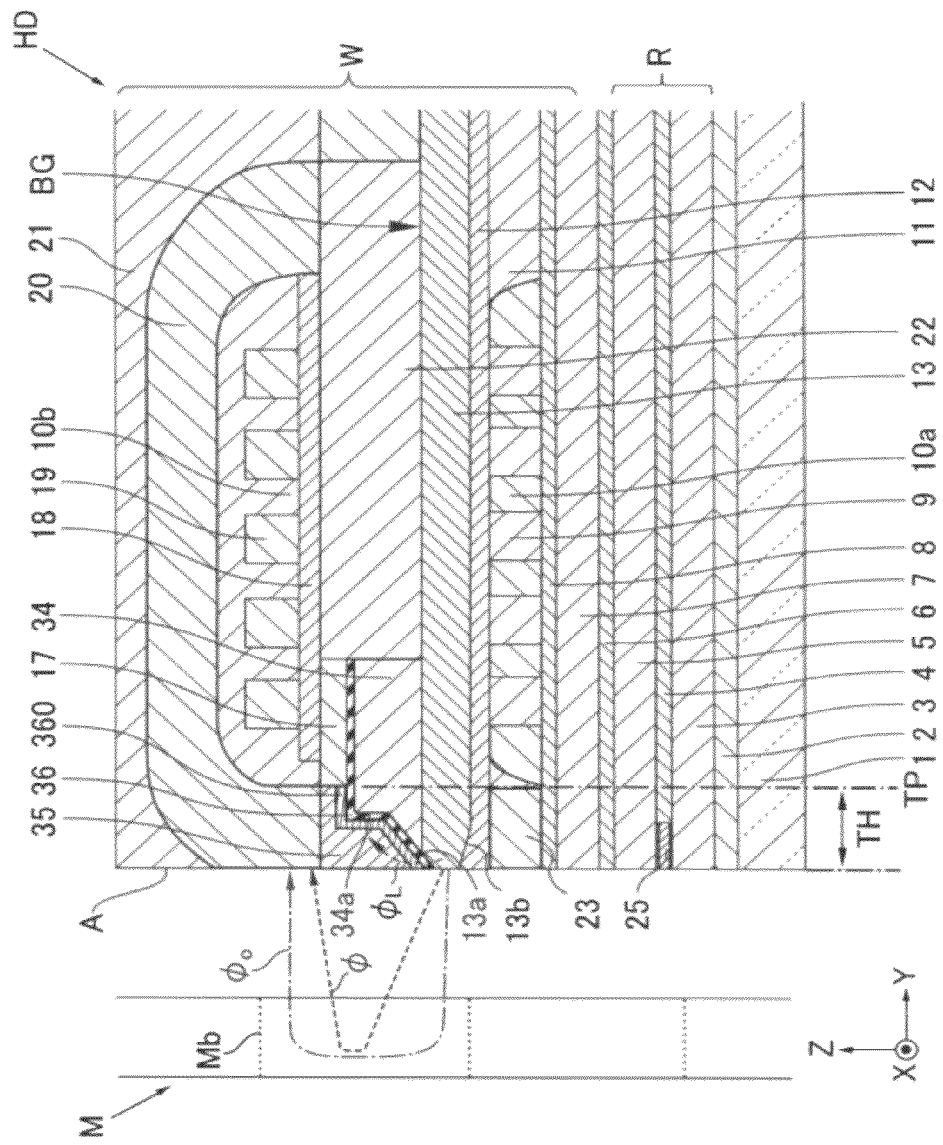
FIG. 6 is a sectional view of a magnetic head according to another embodiment and corresponding to FIG. 2.
Figure 7:
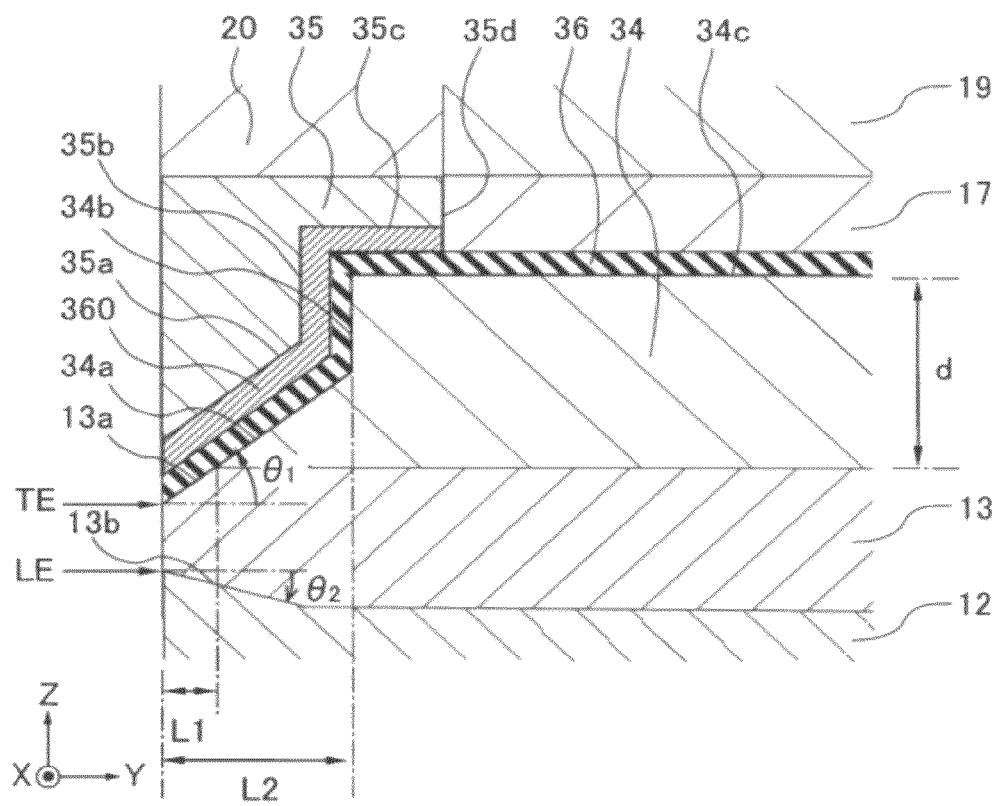
FIG. 7 is an enlarged view of FIG. 6 near a main magnetic pole layer on the side of a magnetic medium-facing surface.

Next will be described a magnetic head according to another embodiment. FIG. 6 is a sectional view of the magnetic head corresponding to FIG. 2, and FIG. 7 is an enlarged view of FIG. 6 near the magnetic pole layer on the side of the magnetic medium-facing surface. In the drawings, the portions identical to those of the foregoing magnetic head are designated by the same symbols and explanations are omitted.

The difference between this magnetic head and the foregoing magnetic head resides in the shape of a non-magnetic layer 34, the shape of a second magnetic layer 360 and a trailing gap layer 36, and the shape of a trailing shield layer 35. The non-magnetic layer 34 has an end face 34b continuous with a rear end of a tapered face 34a as seen from the magnetic medium-facing surface A and a flat face 34c further behind the end face 34b.

On the other hand, the trailing shield layer 35 has an additional rear end 35b in front of a rear end 35d adjacent to the insulating layer 17. The first rear end 35d and the second rear end 35b are continuous with each other through a lower side 35c formed generally parallel to the X-Y plane.

The end face 34b of the non-magnetic layer 34 and the rear end 35b of the trailing shield layer 35 are each generally parallel to the magnetic medium-facing surface A and opposed to each other across the trailing gap layer 36. Moreover, the tapered face 13a, 34a is also opposed to an inclined lower side 35a of the trailing shield layer 35 across the trailing gap layer 36.

In this magnetic head, the distance L1 between the magnetic medium-facing surface A and the rear end of the tapered face 13a of the main magnetic pole layer 13 is, for example, 75 (nm), while the distance L2 between the magnetic medium-facing surface A and the rear end of the tapered face 34a of the non-magnetic layer 34 is, for example, 265 (nm). Moreover, the thickness d of the non-magnetic layer 34 is, for example, 280 (nm). Here, the inclination angles $\theta_1$, $\theta_2$ are similar to those of the foregoing embodiment. However, these values are mere examples and may be determined properly depending on design.

Figure 8:
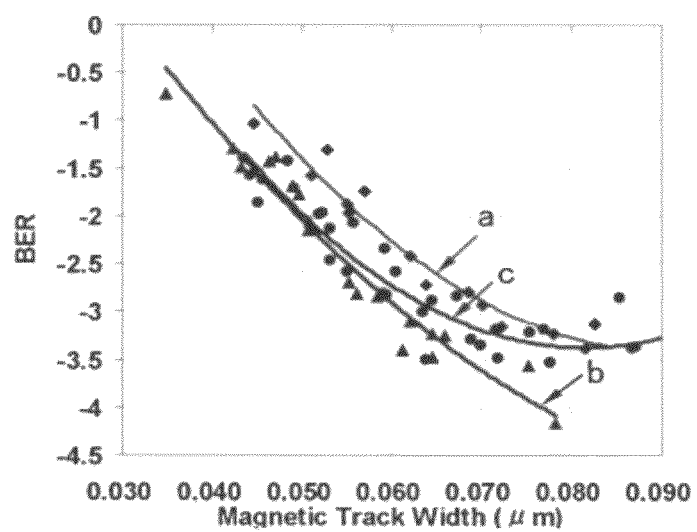
FIG. 8 is a graph showing variation of bit error rate with respect to track width.

FIG. 8 is a graph showing variation of bit error rate (BER) with respect to magnetic track width.

The diamond marks (♦) in the figure indicate measurement values obtained from a conventional magnetic head, and the symbol a in the figure indicates a characteristic graph obtained from the measurement values using an approximate expression. Here, the conventional magnetic head refers to a magnetic head in which the tapered face is not formed at the end of the non-magnetic layer 14, 34 on the side of the magnetic medium-facing surface A and the inclined lower side 15a, 35a of the trailing shield layer 15, is wholly opposed to the tapered face 13a formed at the end of the main magnetic pole layer 13.

On the other hand, the rectangular marks (▲) in the figure indicate measurement values obtained from the magnetic head shown in FIG. 2, and the symbol b in the figure indicates a characteristic graph obtained from the measurement values using an approximate expression. The circular marks (●) in the figure indicate measurement values obtained from the magnetic head shown in FIG. 6, and the symbol b in the figure indicates a characteristic graph obtained from the measurement values using an approximate expression.

As understood from the figure, the magnetic head according to the present invention provides approximately 0.2 to 0.6 (decade) improvement in BER.

2. Method for Manufacturing Magnetic Head

Next will be described a method for manufacturing the foregoing magnetic head HD. Processes before the production process of the magnetic head have been known and do not require specific description. Roughly speaking, it can be manufactured by forming and stacking a series of components in order using a conventional thin-film process including a film formation technique such as plating or sputtering, a patterning technique such as photolithography, an etching technique such as dry etching or wet etching, and a polishing technique such as CMP (chemical mechanical polishing).

The thin film process will be outlined with reference to FIG. 2 and so on; when manufacturing the magnetic head, at first, the insulating layer 2 is formed on the substrate 1, and then the lower read shield film 3, the shield gap film 4 embedded with the reproducing element 5, and the upper read shield film 5 are stacked on the insulating layer 2 in the mentioned order, thereby forming the reproducing head R.

Subsequently, the separating layer 6 is formed on the reproducing head R, and then the magnetic layer 7, the insulating layers 8, 9, the thin film coil 10b, the leading shield layer 23, the insulating layers 11, 12, the main magnetic pole layer 13, the non-magnetic film 14, the insulating layer 17, the trailing gap layer 16, the trailing shield layer 15, the insulating layer 18, the thin film coil 10a, the insulating layer 19, and the return yoke film 20 are stacked on the separating layer 6 in the mentioned order, thereby forming the recording head W. Finally, the overcoat film 21 is formed on the recording head W, and then the air bearing surface A is formed by using a machining process or a polishing process, thereby completing the magnetic head.

In the above-described production process of the magnetic head, the magnetic head manufacturing method according to the present invention is mainly targeted for the process of forming the main magnetic pole layer 13 and the non-magnetic layer 14.

FIGS. 9(a) to 9(m) illustrate events of a formation process of the main magnetic pole layer 13 in a frontal view of the recording medium-facing surface A.

Figure 9A:
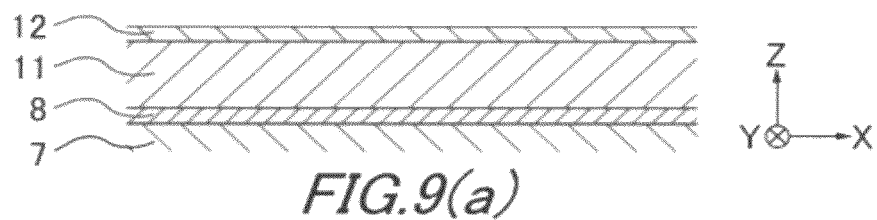
FIG. 9 is a sectional view showing a production process of a magnetic head according to the present invention.

First of all, as shown in FIG. 9(a), the magnetic layer 7 and the insulating layers 8, 11, 12 are stacked in the named order.

Figure 10:
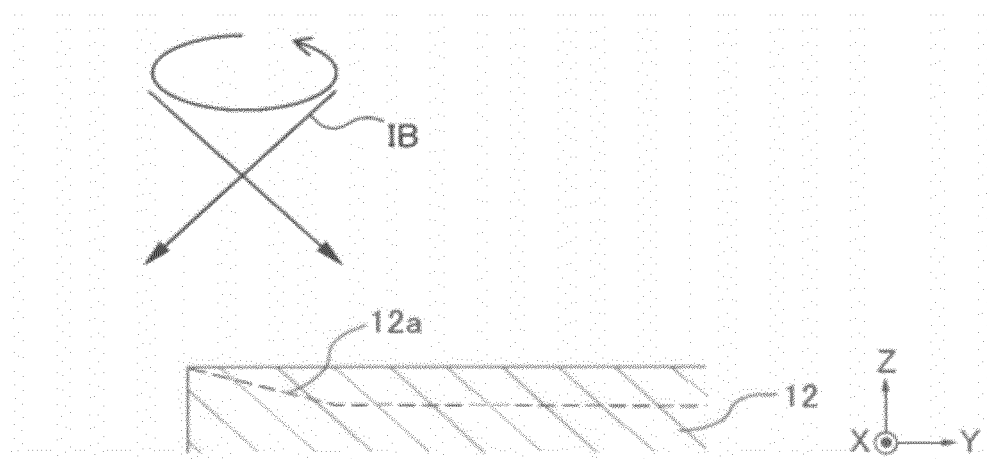
FIG. 10 is a sectional view showing a production process of a magnetic head according to the present invention.

Then, a tapered face is formed in the insulating layer 12 in order to obtain a mold for forming the above-described tapered face 13b of the main magnetic pole layer 13. This event is illustrated in FIG. 10 as an enlarged sectional view taken along the Y-Z plane. As illustrated, the insulating layer 12 is etched by ion milling down to a position indicated by a dotted line. Ion milling is performed by irradiating ion beam IB at a certain angle while oscillating the substrate. Thus, a tapered face 12a is formed in a front area of the upper surface of the insulating layer 12 to reduce a layer thickness rearward.

Figure 9B:
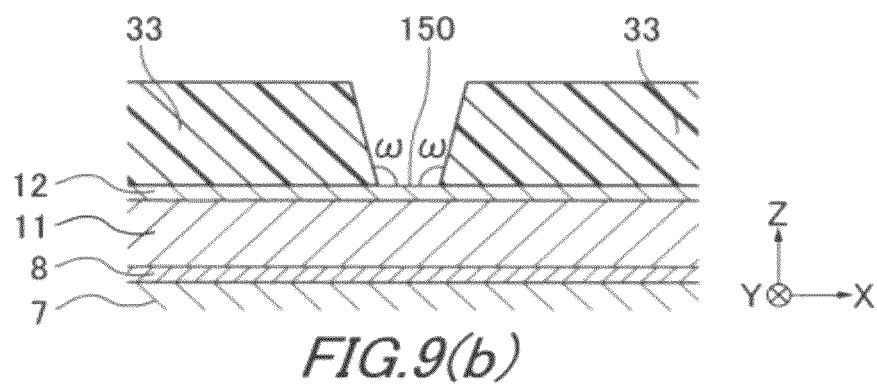

Then, as shown in FIG. 9(b), a resist pattern 33 having a recess 150 is formed on the insulating layer 12. When forming the resist pattern 33, a resist film is formed by applying a resist to the surface of the insulating layer 12, and then the resist film is subjected to patterning (exposure and development) by using a photolithography process. In this case, exposure conditions are adjusted such that the recess 150 spreads with distance from the insulating layer 12 and an inclination angle ω of an inner wall with respect to the surface of the insulating layer 12 is equal to a bevel angle of the pole tip 131 having an inverted trapezoid shape (an exterior angle of the inverted trapezoid shape at the bottom side).

Figure 9C:
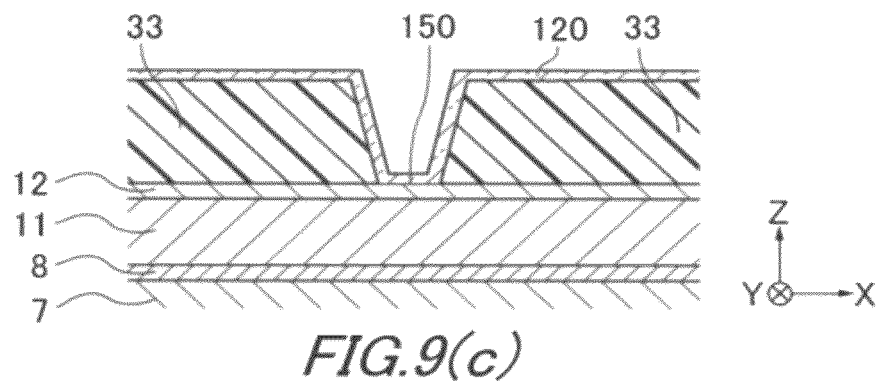

Thereafter, as shown in FIG. 9(c), a non-magnetic film 120 having a uniform film thickness is formed by deposition, using an ALD (atomic layer deposition) process or a CVD (chemical vapor deposition) process, in such a manner as to cover at least the inner wall surfaces of the resist pattern 33 within the recess 150. At this time, the film thickness of the non-magnetic film 120 is adjusted so as to obtain the above-described pole width W1.

Figure 9D:
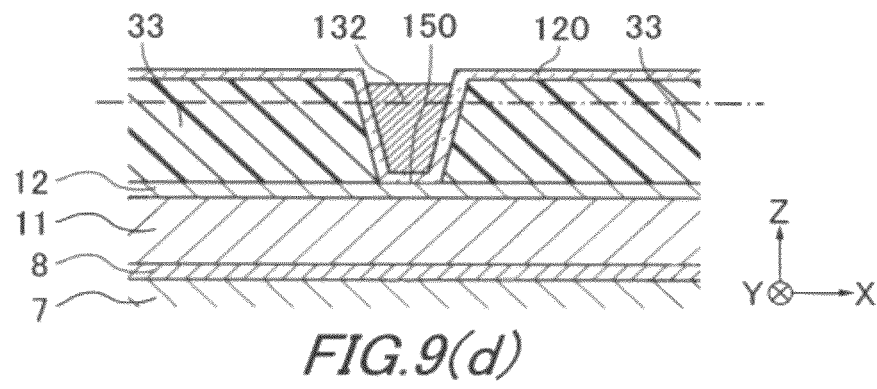

Then, as shown in FIG. 9(d), the tip portion 132 of the main magnetic pole layer 13 is formed within the recess 150 by using an electroplating process or the like. In this case, for example, after formation of a seed layer (not shown), the seed layer is used as an electrode film to grow a plated film. However, it is also possible to use a sputtering process instead of an electroplating process.

Figure 9E:
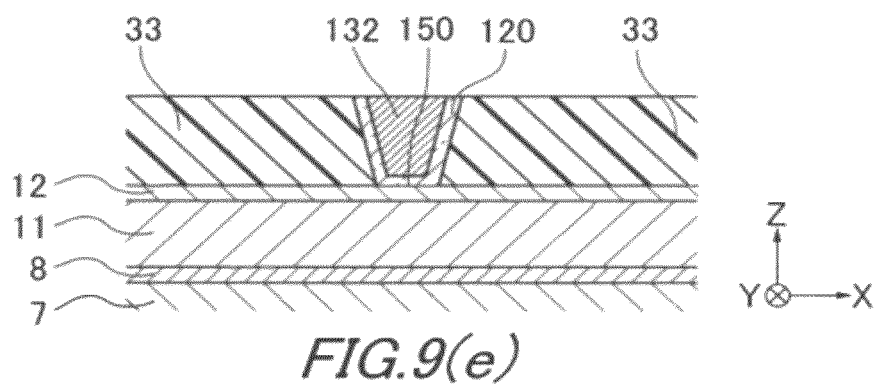

Then, using a milling process or a CMP process, the surface is polished down to a position indicated by a dotted line in the figure. With this, as shown in FIG. 9(e), the resist pattern 33 is exposed at both sides of the tip portion 132.

Figure 9F:
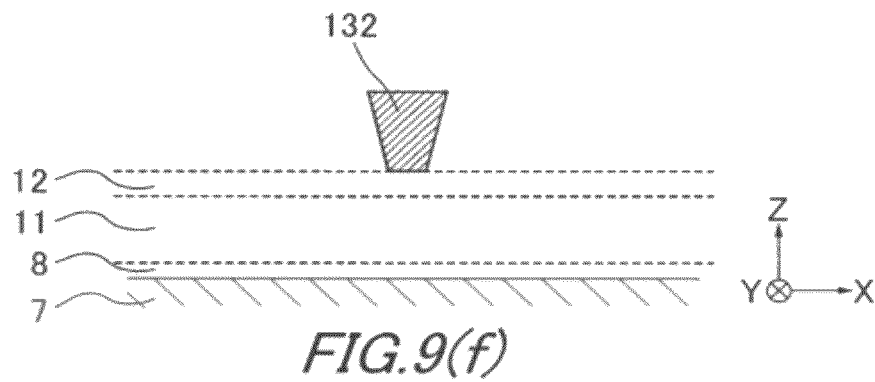

Subsequently, as shown in FIG. 9(f), the resist pattern 33 is removed, for example, by a cleaning process with an organic solvent or an ashing process to expose both side faces of the tip portion 132, and then the insulating layers 11, 12 are selectively removed at an area overlapping with the tip portion 132 in the thickness direction (Z direction) and at both side areas thereof. Concretely, the insulating layers 8, 11, 12 are all removed from an area of the width W3 with the tip portion 132 centered in the recording track width direction (X direction). Here, if the insulating layers 8, 11, 12 are made of alumina, for example, they can be dissolved and removed by using a given solvent (for example, an alkaline solution). As a result, the surface of the magnetic layer 7 is exposed and the tip portion 132 is kept in the air.

Figure 9G:
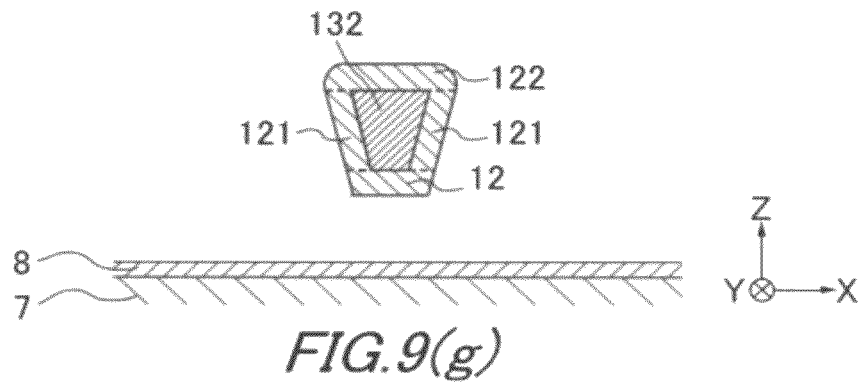

After removal of the insulating layers 8, 11, 12 from an area in the vicinity of the tip portion 132, an insulating material such as alumina is deposited to surround the tip portion 132 by using a CVD process or an ALD process, as shown in FIG. 9(g). This provides the side gaps 121 and an insulating film 122 including the insulating layer 12 as a leading gap. At this time, the insulating material is also deposited on the surface of the magnetic layer 7 to reform the insulating layer 8.

Figure 9H:
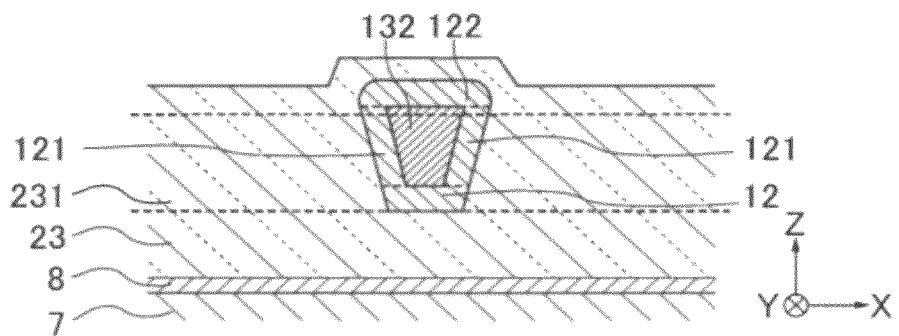

Subsequently, as shown in FIG. 9(h), a magnetic layer 231 is formed by using an electroplating process or the like to cover the whole and completely bury the tip portion 132 and the insulating film 122. Of the magnetic layer 231, a portion located on the leading side as seen from the insulating layer 12 (a portion located adjacent to the insulating layer 8) becomes the leading shield 23.

Figure 9I:
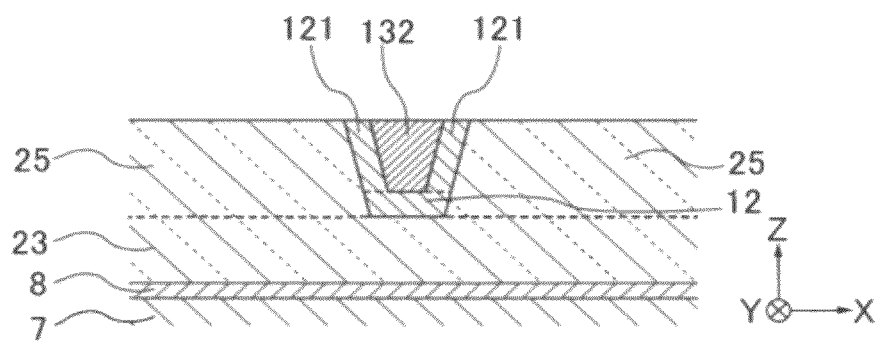

In addition, using a milling process or a CMP process, the surface is polished down to a position indicated by a dotted line in the figure. With this, the tip portion 132 is exposed and the side shields 25 are formed, as shown in FIG. 9(i). At this time, excessive polishing may be performed on demand in order to ensure the exposure of the tip portion 132.

Figure 11:
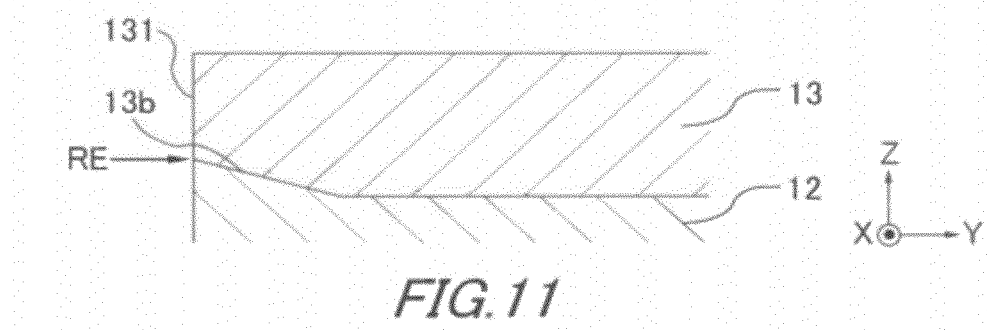
FIG. 11 is a sectional view showing a production process of a magnetic head according to the present invention.

The main magnetic pole layer 13 thus formed is laid on the insulating layer 12 with the pole tip 131 exposed on the magnetic medium-facing surface A, as shown in FIG. 11 as an enlarged sectional view taken along the Y-Z plane. Here, the above-described second tapered face 13b is formed to extend from the leading edge RE of the pole tip 131 along the tapered face 12a of the insulating film 120 shown in FIG. 10.

Next will be described a formation process of the tapered face 13a, 14a with reference to FIGS. 12 and 13, which are similar enlarged sectional views.

Figure 12:
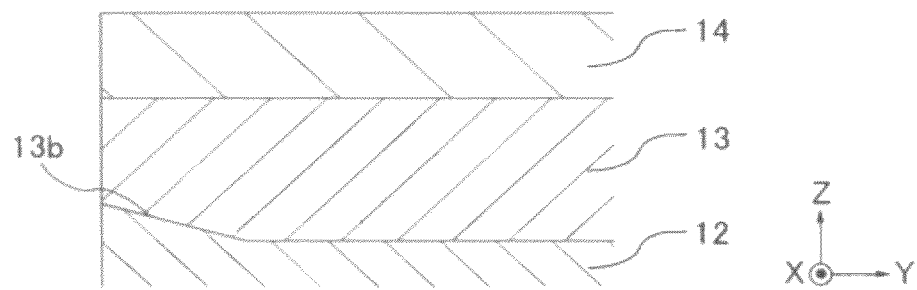
FIG. 12 is a sectional view showing a production process of a magnetic head according to the present invention.

After formation of the main magnetic pole layer 13, the non-magnetic layer 14 is formed by a known technique such as sputtering to be laid on the main magnetic pole layer 13, as shown in FIG. 12.

Figure 13:
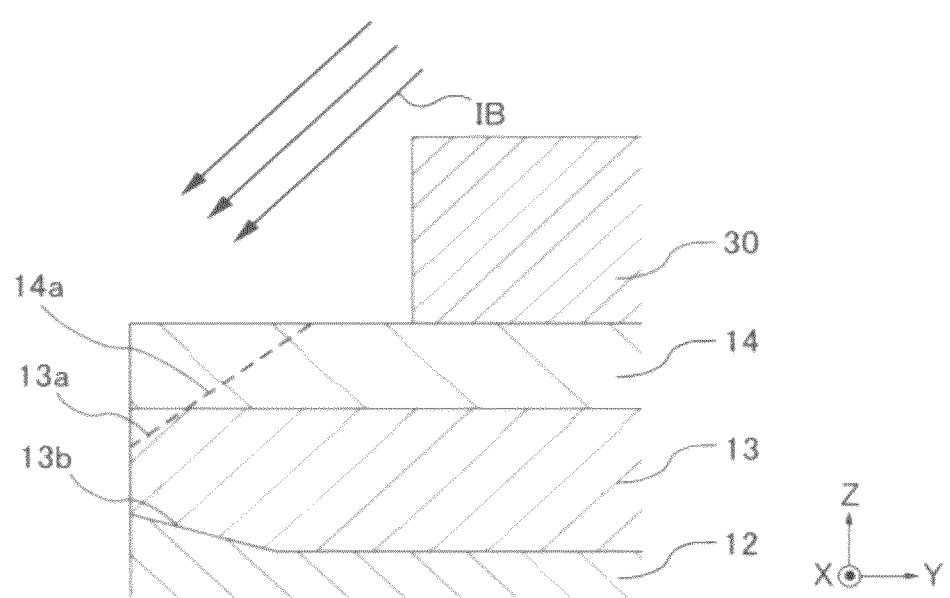
FIG. 13 is a sectional view showing a production process of a magnetic head according to the present invention.

Moreover, as shown in FIG. 13, a resist pattern 30 as a mask for forming the tapered face 13a, 14a is formed on the non-magnetic layer 14 by a photolithography process. A thickness of the resist pattern 30 or the like is properly set depending on the intended tapered face 13a, 14a. Then, the main magnetic pole layer 13 and the non-magnetic layer 14 are etched by ion milling down to a position indicated by a dotted line. Ion milling is performed by irradiating ion beam IB at a certain angle while fixing the substrate. After completion of the etching process, the resist pattern 30 is removed.

Thus, the tapered face 13a, 14a is formed to extend from the trailing edge TE of the pole tip 131, continue from the main magnetic pole layer 13 to the non-magnetic layer 14, and have a constant inclination angle. It should be noted that although ruthenium may be taken as a typical example of the non-magnetic layer 14, as described above, other materials may also be employed as long as having a milling rate close to that of the main magnetic pole layer 13.

Figure 9J:
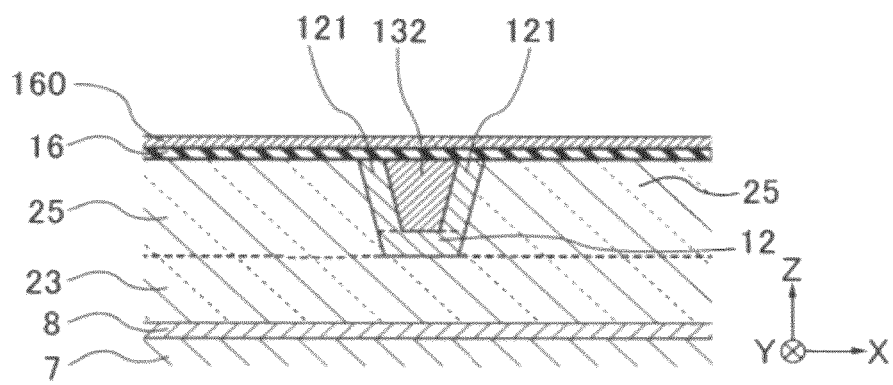
Figure 14:
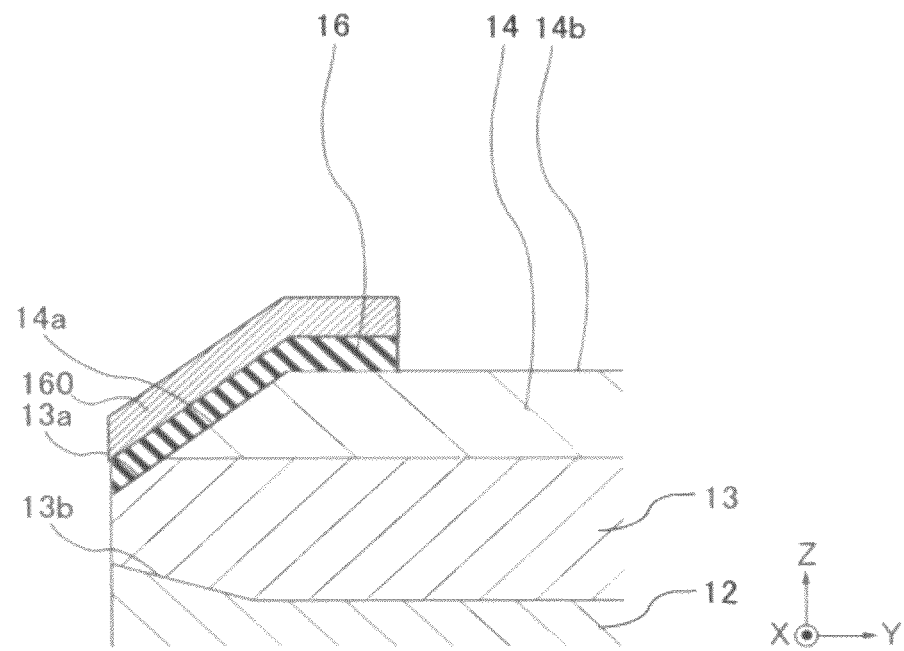
FIG. 14 is a sectional view showing a production process of a magnetic head according to the present invention.

Subsequently, as shown in FIGS. 9(j) and 14, the trailing gap layer 16 and the second magnetic layer 160 are formed by a known technique such as sputtering to be laid on the main magnetic pole layer 13 and the non-magnetic layer 14 and cover the tapered face 13a, 14a and a front portion of the flat face 14b of the non-magnetic layer 14.

Figure 9K:
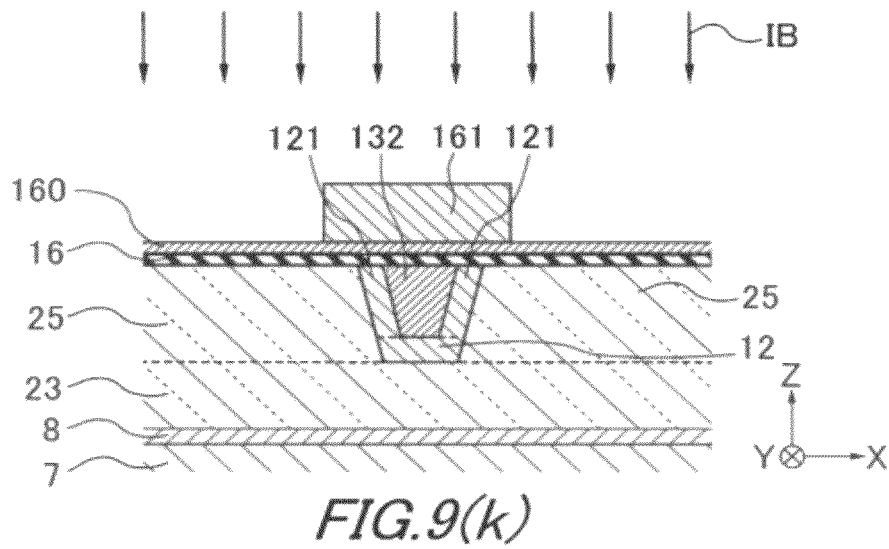

Then, as shown in FIG. 9(k), a resist pattern 161 is formed by a photolithography process in the vicinity of the upper side of the tip portion 132 of the main magnetic pole layer 13. Then, the trailing gap layer 16 and the second magnetic layer 160 are etched and removed by ion milling except the portion in the vicinity of the upper side of the tip portion 132. Ion milling is performed by irradiating ion beam IB from above. After completion of the etching process, the resist pattern 161 is removed.

Figure 9L:
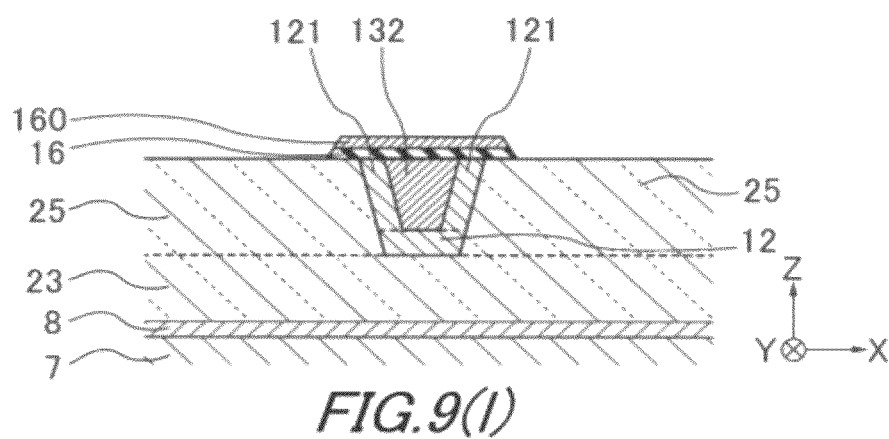

Thus, as shown in FIG. 9(l), there is obtained a layer structure where the trailing gap layer 16 and the second magnetic layer 160 are present only in the vicinity of the upper side of the tip portion 132 as seen from the magnetic medium-facing surface A.

Figure 9M:
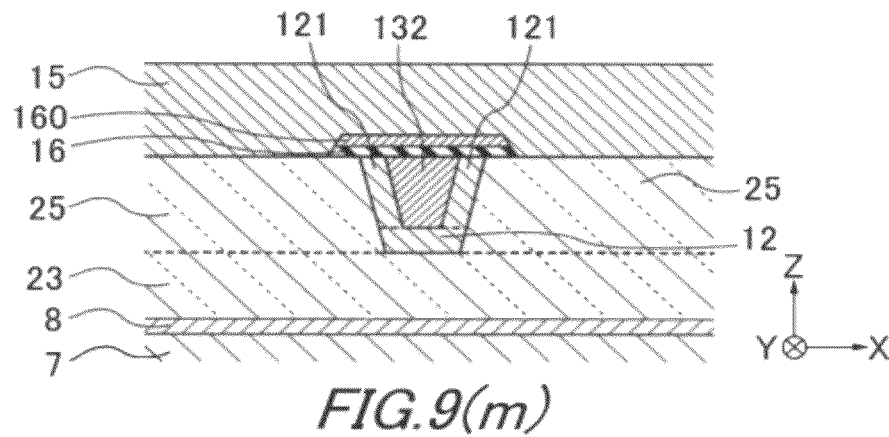
Figure 15:
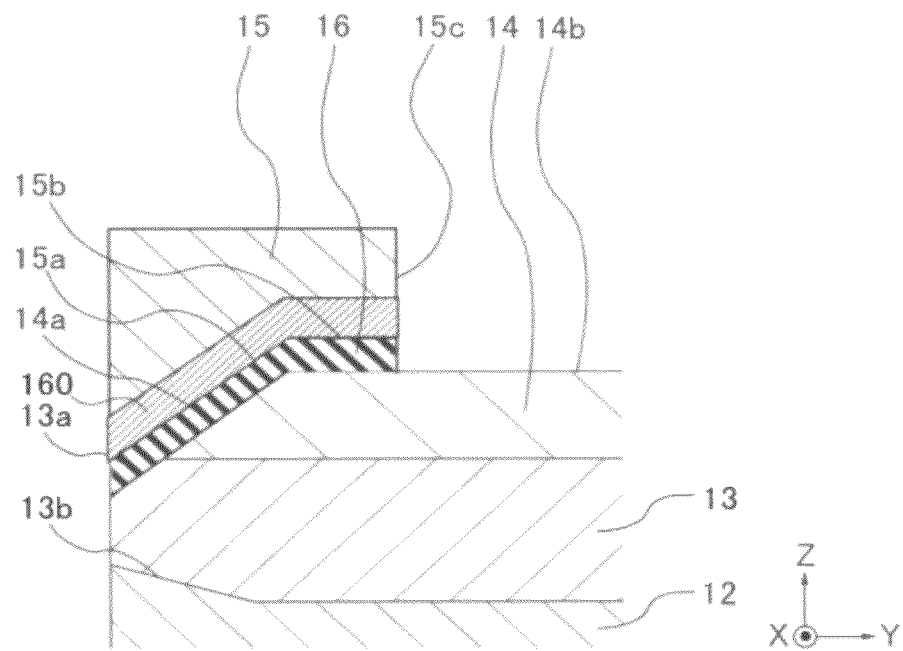
FIG. 15 is a sectional view showing a production process of a magnetic head according to the present invention.

Thereafter, as shown in FIGS. 9(m) and 15, the trailing shield layer 15, which is to be exposed on the magnetic medium-facing surface A, is formed by using a plating process or the like to be laid over the main magnetic pole layer 13 and the non-magnetic layer 14 with the trailing gap layer 16 and the second magnetic layer 160 between.

Then, the auxiliary magnetic pole layer 22 is formed behind the trailing shield layer 15 by a known technique such as sputtering, and the space between it and the trailing shield layer 15 is filled with the insulating layer 17, and the surface is polished by a CMP process. Through the process thus far described, there is obtained the structure of the magnetic head near the main magnetic pole layer 13 and the non-magnetic layer 14 shown in FIG. 2.

In the case of the magnetic head shown in FIG. 6, on the other hand, the formation process of the tapered face 13a, 14a is slightly different from what has been described above. Description will be made below with reference to FIG. 16.

Figure 16:
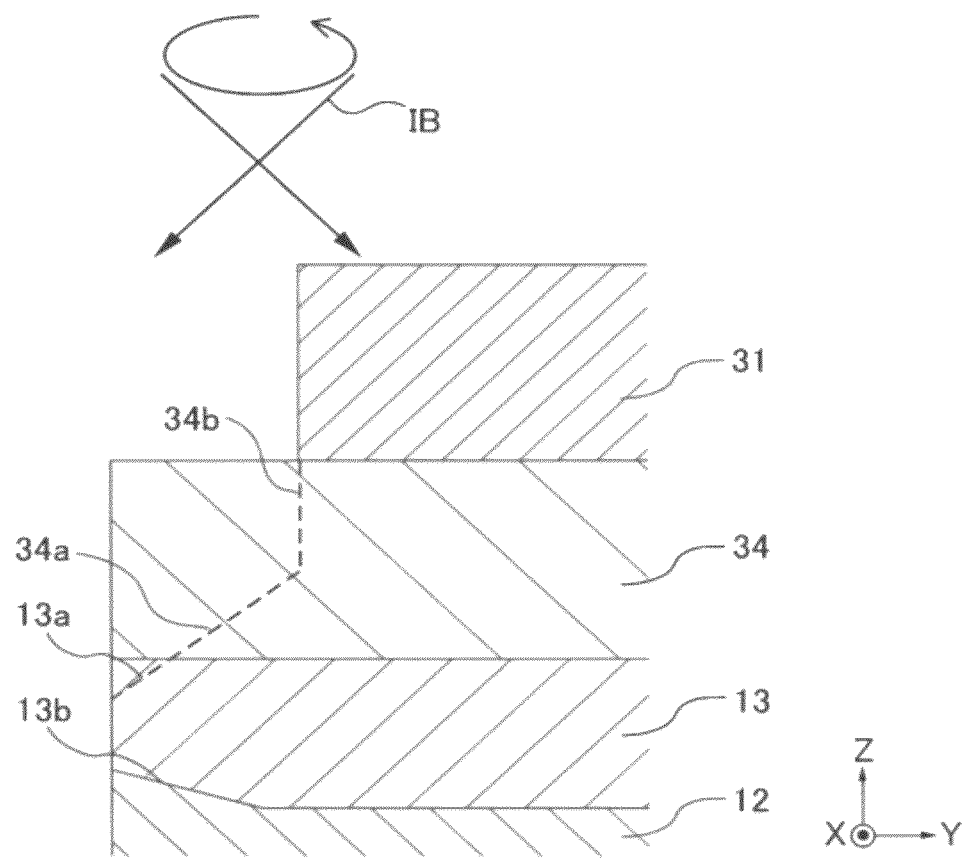
FIG. 16 is a sectional view showing a production process of a magnetic head according to the present invention.

When forming the tapered face 13a, 34a, as shown in FIG. 16, after a hard mask 31 such as of alumina is formed on the non-magnetic layer 34, the main magnetic pole layer 13 and the non-magnetic layer 34 are etched by ion milling down to a position indicated by a dotted line.

In this case, since the end face 34b has to be formed behind the tapered face 13a, 34a as seen from the magnetic medium-facing surface A, ion milling is performed by irradiating ion beam IB at a certain angle while oscillating the substrate, unlike in the foregoing embodiment. That is, while static milling is performed in the foregoing embodiment, dynamic milling is performed in the present embodiment.

In addition, since the non-magnetic layer 34 has a somewhat complicated shape, this milling has to be performed for a longer time than the milling in the foregoing embodiment. Accordingly, as the mask 31 for etching, it is preferable to use alumina, which has a lower milling rate than the resist, or the like. After completion of the milling, the mask 31 is not removed but remains in the multilayered structure as the above-described insulating layer 17.

Since the magnetic head manufacturing method according to the present invention provides the above-described magnetic head, it also exhibits the effects thus far described.

3. Head Assembly

Next will be described a head assembly according to the present invention. The head assembly according to the present invention includes the above-described magnetic head and a head support device. The head support device supports the magnetic head in such a manner as to permit rolling and pitching of the magnetic head. In the present invention, examples of the head assembly include an HGA (head gimbal assembly) in which the magnetic head is mounted on a head support device (gimbal) and an HAA (head arm assembly) in which the HGA is mounted on an arm.

Figure 17:
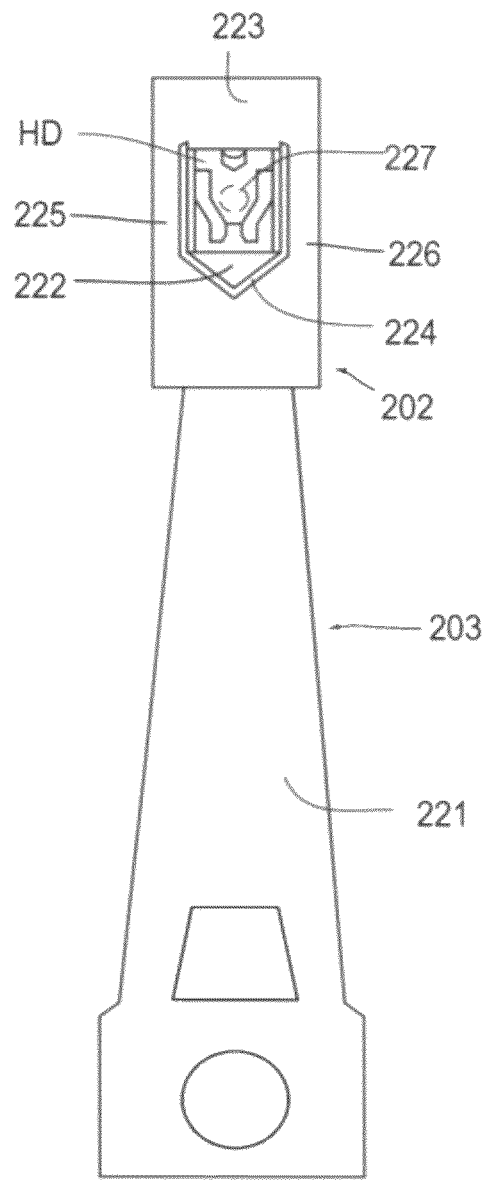
FIG. 17 is a plan view of an HGA.
Figure 18:
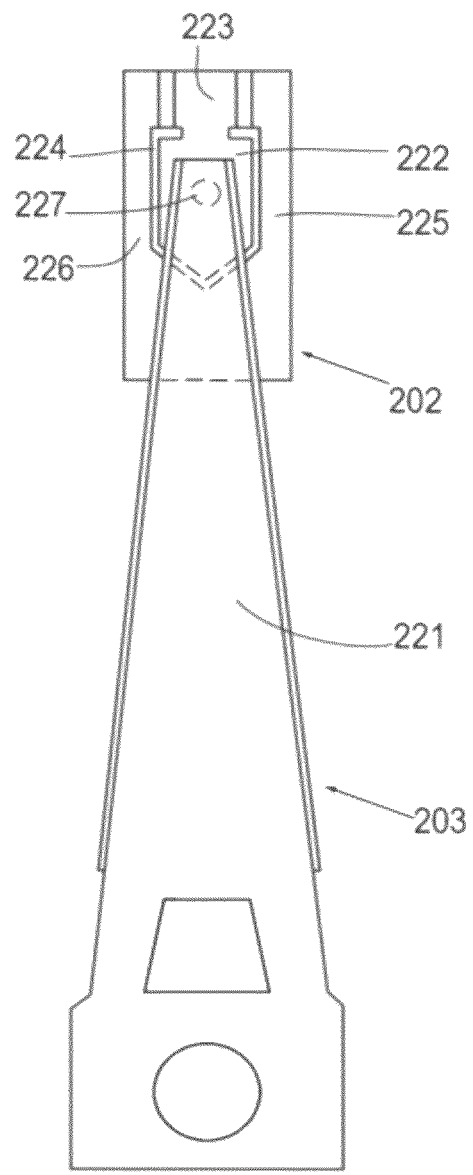
FIG. 18 is a bottom view of the HGA shown in FIG. 17.

FIG. 17 is a front view of a head assembly according to the present invention, and FIG. 18 is a bottom view of the head assembly shown in FIG. 17. The head assembly is an HGA including a suspension 203 and the magnetic head HD. The suspension 203 includes a load beam 221 and a flexure 202. The load beam 221 has a load dimple 227 in proximity to a free end on a centrally-extending longitudinal axis.

The flexure 202 is formed from a thin leaf spring and subjected to a pressing load from the load dimple 227 with one side thereof attached to one side of the load beam 221 where the load dimple 227 is located. The magnetic head HD is attached to the other side of the flexure 202. The flexure 202 is bonded to the load beam 221 at the side where the load dimple 227 is located.

The flexure 202 has a tongue portion 222 in the center thereof. At one end, the tongue portion 222 is bonded to a lateral frame portion 223 of the flexure 202. Both ends of the lateral frame portion 223 of the flexure 202 are connected to outer frame portions 225, 226. A groove 224 is formed between the tongue portion 222 and the outer frame portions 225, 226, extending around the tongue portion 222. The magnetic head HD is attached to one side of the tongue portion 222 by means of an adhesive or the like, which is kept in spring contact with the tip of the load dimple 227.

One face of the magnetic head HD opposite from the air bearing surface of the slider is attached to the tongue portion 222 of the suspension 203. Flexible leads and so on not shown in the drawings are connected to the magnetic head HD.

Figure 19:
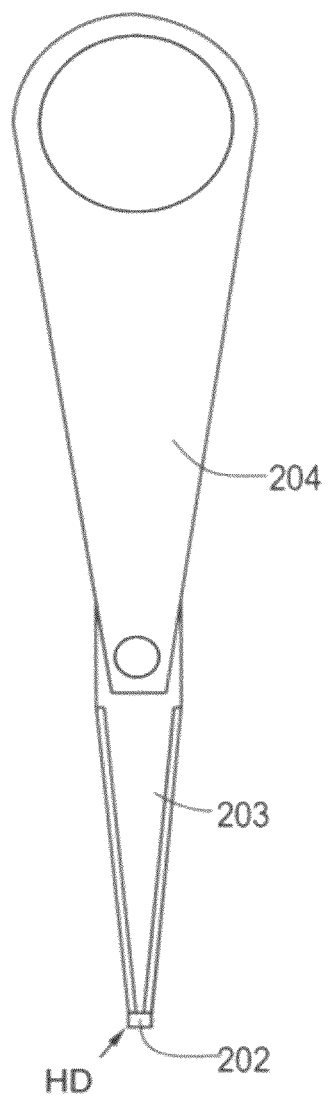
FIG. 19 is a plan view of an HAA.

FIG. 19 is a front view of an HAA. The HAA includes the suspension 203, the magnetic head HD and an arm 204. The arm 204 is integrally formed from a suitable non-magnetic metallic material such as aluminum alloy. The arm 204 is provided with a mounting hole. The mounting hole is used for mounting on a positioning device provided in a magnetic disk apparatus. One end of the suspension 203 is secured to the arm 204, for example, with a ball connecting structure.

Since the head assembly includes the magnetic head according to the present invention, it also has the same effects.

4. Magnetic Recording/Reproducing Apparatus

Figure 20:
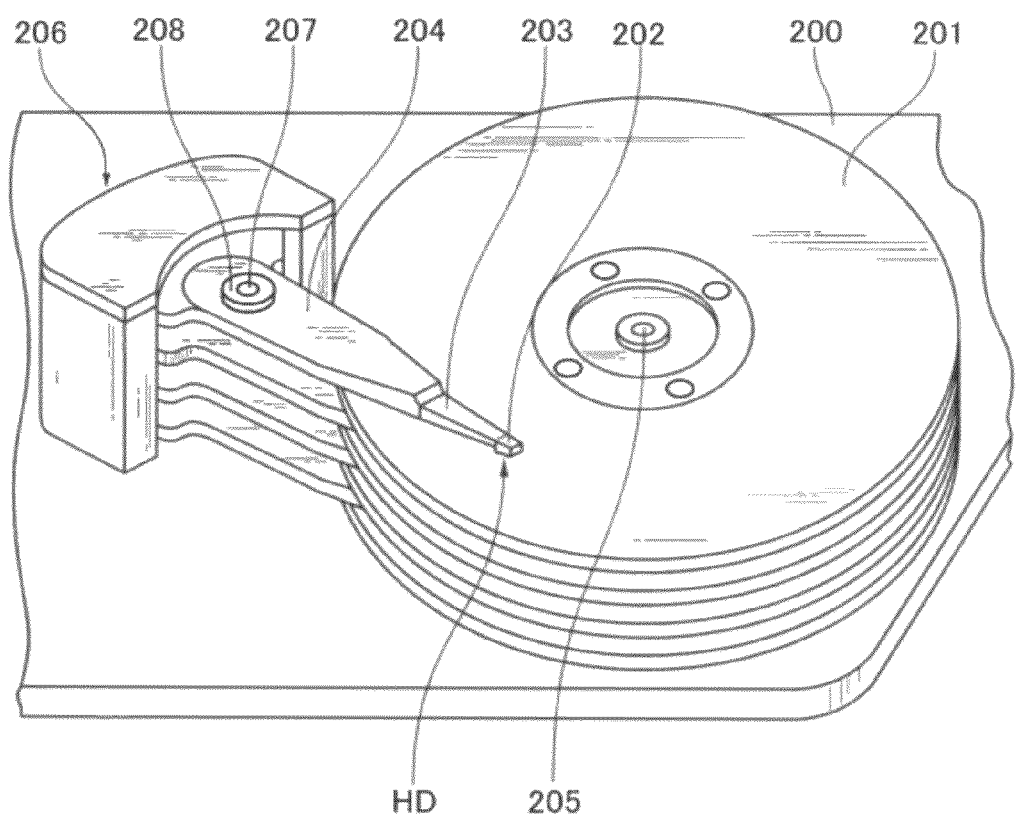
FIG. 20 is a perspective view of an internal structure of a magnetic recording/reproducing apparatus.

Finally, a magnetic recording/reproducing apparatus according to the present invention will be described. FIG. 20 is a perspective view of the magnetic recording/reproducing apparatus. In FIG. 20, a case 200 is partially cut out, making it easy to see the internal structure of the apparatus.

This magnetic recording/reproducing apparatus is equipped with the above head assembly, and in the present embodiment, a hard disk drive is taken as an example for explanation. The magnetic recording/reproducing apparatus includes, within the case 200, a plurality of magnetic disks (i.e., hard disks) 201 corresponding to the magnetic recording medium M, on which information is to be magnetically recorded, a plurality of suspensions 203 disposed correspondingly to the respective magnetic disks 201 and supporting the magnetic heads HD at their one ends, and a plurality of arms 204 supporting the other ends of the suspensions 203.

When the magnetic disk 201 rotates for recording or reproducing information, the magnetic head HD takes off from the recording surface of the magnetic disk 201 utilizing an airflow generated between the recording surface (magnetic head-facing surface) of the magnetic disk 201 and the air bearing surface A.

The magnetic disks 201 are rotatable about a spindle motor 205 which is fixed to the case 200. The arms 204 are connected to an actuator 206 being a power source and are pivotable through a bearing 208 about a fixed shaft 207 which is fixed to the case 200. The actuator 206 is constructed to include, for example, a driving source such as a voice coil motor.

Using the head assembly equipped with the magnetic head, as has been described above, the magnetic recording/reproducing apparatus records information on the magnetic disk 201 by applying a recording magnetic field and reproducing information from the magnetic disk. Thus, the magnetic recording/reproducing apparatus has the same effects as the magnetic head according to the present invention.

The present invention has been described in detail above with reference to preferred embodiments. However, obviously those skilled in the art could easily devise various modifications of the invention based on the technical concepts underlying the invention and teachings disclosed herein.

What is claimed is:

1. A magnetic head comprising a magnetic pole layer, a non-magnetic layer, a trailing gap layer, and a trailing shield layer, wherein
   the magnetic pole layer has a pole tip exposed on a magnetic medium-facing surface,
   the non-magnetic layer is laid on the magnetic pole layer,
   the trailing shield layer is exposed on the magnetic medium-facing surface and laid over the magnetic pole layer and the non-magnetic layer with the trailing gap layer between,
   the magnetic pole layer and the non-magnetic layer have a continuous tapered face opposed to a lower side of the trailing shield layer, and
   the tapered face extends from a trailing edge of the pole tip at a constant inclination angle, and
   the non-magnetic layer has an end face extending from a rear end of the tapered face as seen from the magnetic medium-facing surface, and the end face is opposed to a rear end of the trailing shield layer across the trailing gap layer.

2. The magnetic head of claim 1, wherein a rear end of the tapered face is located in front of a throat height zero position as seen from the magnetic medium-facing surface.

3. The magnetic head of claim 1, wherein the magnetic pole layer has a second tapered face extending from a leading edge of the pole tip.

4. The magnetic head of claim 3, wherein a rear end of the second tapered face is located in front of a throat height zero position as seen from the magnetic medium-facing surface.

5. A head assembly comprising a magnetic head and a head support device, wherein
   the magnetic head is claimed in claim 1, and
   the head support device supports the magnetic head in such a manner as to permit rolling and pitching of the magnetic head.

6. A magnetic recording/reproducing apparatus comprising a head assembly and a magnetic recording medium, wherein
   the head assembly is claimed in claim 5 and capable of recording information on the magnetic recording medium by applying a recording magnetic field and reproducing information from the magnetic recording medium.

7. A magnetic head comprising a magnetic pole layer, a non-magnetic layer, a trailing gap layer, and a trailing shield layer, wherein the magnetic pole layer has a pole tip exposed on a magnetic medium-facing surface, the non-magnetic layer is laid on the magnetic pole layer, the trailing shield layer is exposed on the magnetic medium-facing surface and laid over the magnetic pole layer and the non-magnetic layer with the trailing gap layer between, the magnetic pole layer and the non-magnetic layer have a continuous tapered face opposed to a lower side of the trailing shield layer, and the tapered face extends from a trailing edge of the pole tip at a constant inclination angle, the magnetic pole layer has a second tapered face extending from a leading edge of the pole tip, and a rear end of the second tapered face is located in front of a rear end of the tapered face as seen from the magnetic medium-facing surface.

8. The magnetic head of Claim 7, wherein the non-magnetic layer has a flat face continuous with a rear end of the tapered face as seen from the magnetic medium-facing surface, and the flat face is at least partially opposed to the lower side of the trailing shield layer across the trailing gap layer.

9. A method for manufacturing a magnetic head including a magnetic pole layer, a non-magnetic layer, a trailing gap layer, and a trailing shield layer, the method comprising:

forming the magnetic pole layer with a pole tip exposed on a magnetic medium-facing surface;

forming the non-magnetic layer laid on the magnetic pole layer;

forming a mask on the non-magnetic layer;

forming a tapered face by milling to extend from a trailing edge of the pole tip, continue from the magnetic pole layer to the non-magnetic layer, and have a constant inclination angle;

forming the trailing gap layer laid on the magnetic pole layer and the non-magnetic layer to cover at least the tapered face; and forming the trailing shield layer over the magnetic pole layer and the non-magnetic layer with the trailing gap layer therebetween to be exposed on the magnetic medium-facing surface, wherein by the milling, the non-magnetic layer is formed with an end face continuous with a rear end of the tapered face as seen from the magnetic medium-facing surface, the trailing shield layer is formed with a rear end opposed to the end face across the trailing gap layer.

10. The magnetic head manufacturing method of claim 9, wherein the trailing shield layer is formed with a lower side opposed across the trailing gap layer to at least a portion of a flat face of the non-magnetic layer, which is continuous with a rear end of the tapered face as seen from the magnetic medium-facing surface.

11. The magnetic head manufacturing method of claim 9, wherein the tapered face is formed with a rear end located in front of a throat height zero position as seen from the magnetic medium-facing surface.

12. The magnetic head manufacturing method of claim 9, wherein the magnetic pole layer is formed with a second tapered face extending from a leading edge of the pole tip.

13. The magnetic head manufacturing method of claim 12, wherein the magnetic pole layer is formed with a rear end of the second tapered face located in front of a throat height zero position as seen from the magnetic medium-facing surface.

14. A method for manufacturing a magnetic head including a magnetic pole layer, a non-magnetic layer, a trailing gap layer, and a trailing shield layer, the method comprising:

forming the magnetic pole layer with a pole tip exposed on a magnetic medium-facing surface;

forming the non-magnetic layer laid on the magnetic pole layer;

forming a mask on the non-magnetic layer;

forming a tapered face by milling to extend from a trailing edge of the pole tip, continue from the magnetic pole layer to the non-magnetic layer, and have a constant inclination angle;

forming the trailing gap layer laid on the magnetic pole layer and the non-magnetic layer to cover at least the tapered face; and forming the trailing shield layer over the magnetic pole layer and the non-magnetic layer with the trailing gap layer therebetween to be exposed on the magnetic medium-facing surface, wherein the magnetic pole layer is formed with a second tapered face extending from a leading edge of the pole tip, and the magnetic pole layer is formed with a rear end of the second tapered face located in front of a rear end of the tapered face as seen from the magnetic medium-facing surface.

\* \* \* \* \*